United States Patent [19]

Kato et al.

[11] Patent Number: 5,240,233

[45] Date of Patent: Aug. 31, 1993

[54] FLUID-FILLED ELASTIC MOUNT HAVING FLUID CHAMBERS CLOSED BY CLOSURE MEMBER INCLUDING METALLIC MEMBER, AND A METHOD OF PRODUCING THE SAME

[75] Inventors: Rentaro Kato; Tatsuya Suzuki, both of Kasugai, Japan

[73] Assignee: Tokai Rubber Industries, Ltd., Japan

[21] Appl. No.: 892,135

[22] Filed: Jun. 2, 1992

[30] Foreign Application Priority Data

Jun. 3, 1991 [JP] Japan .................................. 3-159980

[51] Int. Cl.$^5$ ................................................ F16M 5/00
[52] U.S. Cl. .............................. 267/140.13; 267/219; 248/562; 248/636; 29/897.2; 29/450
[58] Field of Search ................ 267/140.13, 140.11, 267/140.14, 219, 35; 248/562, 566, 636, 638; 29/897.2, 436, 450; 277/29

[56] References Cited

U.S. PATENT DOCUMENTS

| | | | |
|---|---|---|---|
| 4,448,461 | 5/1984 | Otto | 277/29 |
| 4,905,955 | 3/1990 | Brizzolesi et al. | 267/140.13 |
| 4,997,168 | 3/1991 | Kato | 267/140.13 |
| 4,998,345 | 3/1991 | Funahashi et al. | 267/140.12 |
| 5,009,403 | 4/1991 | Kato et al. | 248/562 |

FOREIGN PATENT DOCUMENTS 60-104824 6/1985 Japan .

Primary Examiner—Robert J. Oberleitner
Assistant Examiner—Kevin D. Rutherford
Attorney, Agent, or Firm—Parkhurst, Wendel & Rossi

[57] ABSTRACT

A fluid-filled elastic mount including a first and a second support member, an elastic body for elastically connecting the two support members, and a closure member fixed to the second support member to form a fluid chamber therein. The closure member includes a flexible diaphragm and a metallic member secured to the outer periphery of the diaphragm. The metallic member is press-fitted in a large-diameter portion of the second support member remote from the first support member, and fixed by caulking to the large-diameter portion. At least one sealing rubber lip is pressed between the metallic member and the second support member to assure the fluid tightness of the fluid chamber. Further, a fluid discharge passage is formed radially outwardly of the sealing rubber lip(s), between the metallic member and the large-diameter portion of the second support member, for permitting the fluid to be discharged from the fluid chamber. Also disclosed is a method of producing such a fluid-filled elastic mount.

9 Claims, 6 Drawing Sheets

FLUID-FILLED ELASTIC MOUNT HAVING FLUID CHAMBERS CLOSED BY CLOSURE MEMBER INCLUDING METALLIC MEMBER, AND A METHOD OF PRODUCING THE SAME

BACKGROUND OF THE INVENTION

1. Field of the Invention

The present invention relates to a fluid-filled elastic mount which has improved and simplified construction and which can be readily assembled with improved efficiency, and to a method of producing such a fluid-filled elastic mount.

2. Discussion of the Prior Art

An elastic mount is known as a vibration damping device interposed between two members of a vibration system, for flexibly connecting these two members. As one type of such elastic mount, there is known a so-called fluid-filled elastic mount as disclosed in laid-open Publication No. 60-104824 of unexamined Japanese Patent Application, which includes a first and a second rigid support member that are fixed to one and the other of the two members to be flexibly connected, and are spaced a suitable distance apart from each other in the direction in which the mount receives a vibrational load. The fluid-filled elastic mount further includes an elastic body interposed between the first support member and one of axially opposite openings of the second support member to elastically connect the first and second support members, and a flexible diaphragm adapted to fluid-tightly close the other axial opening of the second support member to thereby form a fluid chamber in the mount, which is filled with a suitable non-compressible fluid. In this fluid-filled elastic mount, the fluid chamber consists of a pressure-receiving chamber partially defined by the elastic body, and an equilibrium chamber partially defined by the flexible diaphragm, with these two chambers communicating with each other through an orifice passage. Thus, the elastic mount of this type provides an intended vibration damping effect based on the resonance of the fluid flowing through the orifice passage between the pressure-receiving and equilibrium chambers.

To assure the fluid tightness of the fluid chamber of the fluid-filled elastic mount of the above type, the flexible diaphragm needs to be attached to the corresponding opening of the second support member with a high degree of fluid-tight seal between the diaphragm and support member. Conventionally, the outer peripheral portion of the flexible diaphragm is fixed by caulking to the opening of the second support member, so that the opening of the support member may be fluid-tightly closed by the diaphragm.

To simplify and expedite the procedure for filling the fluid chamber with the fluid in the above elastic mount, it is recently proposed to produce the elastic mount by preparing an integral assembly of the first and second support members integrally connected by the elastic body, immersing the integral assembly in a mass of a fluid suited for use in the mount, and fixing the flexible diaphragm by caulking to the second support member in the fluid mass so as to form the fluid chamber filled with the fluid.

In producing the known elastic mount according to the above-described method, however, the second support member must be caulked against the flexible diaphragm within the fluid. This necessitates the cumbersome procedure and complicated installation which push up the cost of manufacturing the elastic mount.

Where the second support member is assembled with a protective rigid member for protecting the flexible diaphragm and/or a bracket adapted for attachment of the support member to one of the two members to be flexibly connected, for example, these protective member and bracket as well as the flexible diaphragm are fixed by caulking to one axial end portion of the second support member, as disclosed in the above-identified publication. In this case, however, the protective member and bracket must also be immersed in the mass of fluid for attachment to the second support member, making it necessary to clean these member and bracket after being taken out of the fluid. This results in more cumbersome and difficult procedure for assembling the elastic mount.

Generally, the bracket or other member must be properly positioned or oriented relative to the first support member when it is mounted on the second support member. Since the mounting of the bracket is effected in the fluid, taking account of its orientation, the mounting procedure suffers from considerably lowered efficiency, and is difficult to automate.

SUMMARY OF THE INVENTION

It is therefore an object of the present invention to provide improved construction of a fluid-filled elastic mount which requires a simplified assembling procedure in a mass of a fluid, and a method of producing such an elastic mount.

The above object may be attained according to a first aspect of the present invention, which provides a fluid-filled elastic mount for flexibly connecting two members, comprising: (a) a first and a second support member which are fixed to one and the other of the two members to be flexibly connected, the first and second support members being spaced apart from each other in an axial direction of the elastic mount, the second support member having a generally cylindrical shape with axially opposite openings; (b) an elastic body interposed between the first support member and one of the axially opposite openings of the second support member, to elastically connect the first and second support members; (c) the second support member including a shoulder portion which extends radially outwards from an axially intermediate portion thereof, and a large-diameter portion which extends axially outwards from the shoulder portion to define the other of the axially opposite openings of the second support member; (d) a closure member fluid-tightly closing the other of the axially opposite openings of the second support member to thereby form a fluid chamber in the second support member, the closure member comprising a flexible diaphragm and a metallic member secured to an outer peripheral portion of the flexible diaphragm, the metallic member being press-fitted in the large-diameter portion of the second support member and fixed therein by caulking of the large-diameter portion, whereby the closure member is fixed to the second support member, the fluid chamber being filled with a non-compressible fluid and comprising a pressure-receiving chamber partially defined by the elastic body and an equilibrium chamber partially defined by the flexible diaphragm, the pressure-receiving and equilibrium chambers communicating with each other through an orifice passage; (e) at least one sealing rubber lip formed on at least one of mutually facing surfaces of the metallic member and the shoulder portion of the second support member, so as to protrude in the load-receiving direction and extend over an entire circumference of the second support member, the at least one sealing rubber lip being pressed between the metallic member and the shoulder portion; and (f) means for defining a fluid discharge passage located radially outwardly of the at least one sealing rubber lip and formed between the metallic member and the large-diameter portion of the second support member, for permitting discharge of the non-compressible fluid from the fluid chamber, the fluid discharge passage extending in a direction in which the metallic member is press-fitted into the large-diameter portion.

The above object may also be attained according to a second aspect of the present invention, which provides a method of producing a fluid-filled elastic mount comprising: a first and a second support member which are spaced apart from each other in an axial direction of the elastic mount, the second support member having a generally cylindrical shape with axially opposite openings; an elastic body interposed between the first support member and one of the axially opposite openings of the second support member, to elastically connect the first and second support members; and a closure member including a rubber diaphragm, for fluid-tightly closing the other of the axially opposite openings of the second support member to thereby form a fluid chamber in the second support member, the fluid chamber being filled with a non-compressible fluid and comprising a pressure-receiving chamber partially defined by the elastic body and an equilibrium chamber partially defined by the rubber diaphragm, the pressure-receiving and equilibrium chambers communicating with each other through an orifice passage, the method comprising the steps of: (a) preparing a first assembly of said first and second support members elastically connected by said elastic body, the second support member being formed to have a shoulder portion which extends radially outwards from an axially intermediate portion thereof, and a large-diameter portion which extends axially outwards from the shoulder portion to define the other of the axially opposite openings of the second support member; (b) securing a metallic member to an outer peripheral portion of the rubber diaphragm to thereby provide the closure member; (c) press-fitting the metallic member into the large-diameter portion of the second support member in a mass of the non-compressible fluid, while discharging a redundant portion of the fluid from the fluid chamber, through a fluid discharge passage formed between press-fitted surfaces of the large-diameter portion and the metallic member; (d) forming at least one sealing rubber lip on at least one of mutually facing surfaces of the metallic member and the shoulder portion of the second support member, so that the at least one sealing rubber lip is pressed between the shoulder portion and the metallic member, whereby the other opening of the second support member is fluid-tightly closed by the closure member to provide a second assembly having the fluid chamber formed therein; and (e) taking the second assembly out of the mass of the non-compressible fluid, and caulking the large-diameter portion of the second support member against the metallic member in the atmosphere so as to fix the metallic member to the second support member.

According to the method as described above, the closure member having the flexible diaphragm is fixed to the integral assembly of the first and second support members connected by the elastic body, within a mass of the non-compressible fluid, so as to form the fluid chamber filled with the fluid. Upon the formation of the fluid chamber, the metallic member secured to the diaphragm is press-fitted into the large-diameter portion of the second support member so as to assure the fluid tightness of the fluid chamber. This permits the large-diameter portion to be caulked against the metallic member in the atmosphere, resulting in a considerably simplified procedure of assembling the mount in the fluid mass. Thus, the elastic mount of the present invention may be manufactured with significantly improved efficiency, utilizing an accordingly simplified installation for manufacturing the mount.

During the press-fitting of the metallic member into the large-diameter portion of the second support member, a redundant portion of the fluid is discharged from the fluid chamber, through the fluid discharge passage formed between the metallic member and the large-diameter portion. Accordingly, the pressure of the fluid in the fluid chamber is prevented from being excessively increased due to the volume reduction of the fluid chamber upon press-fitting of the metallic member. Consequently, the engine mount thus obtained assures desired vibration damping capability with significantly improved stability.

BRIEF DESCRIPTION OF THE DRAWINGS

The above and optional objects, features and advantages of the present invention will be better understood by reading the following detailed description of a presently preferred embodiment of the invention, when considered in conjunction with the accompanying drawings, in which.

DETAILED DESCRIPTION OF THE PREFERRED EMBODIMENT

Figure 1:
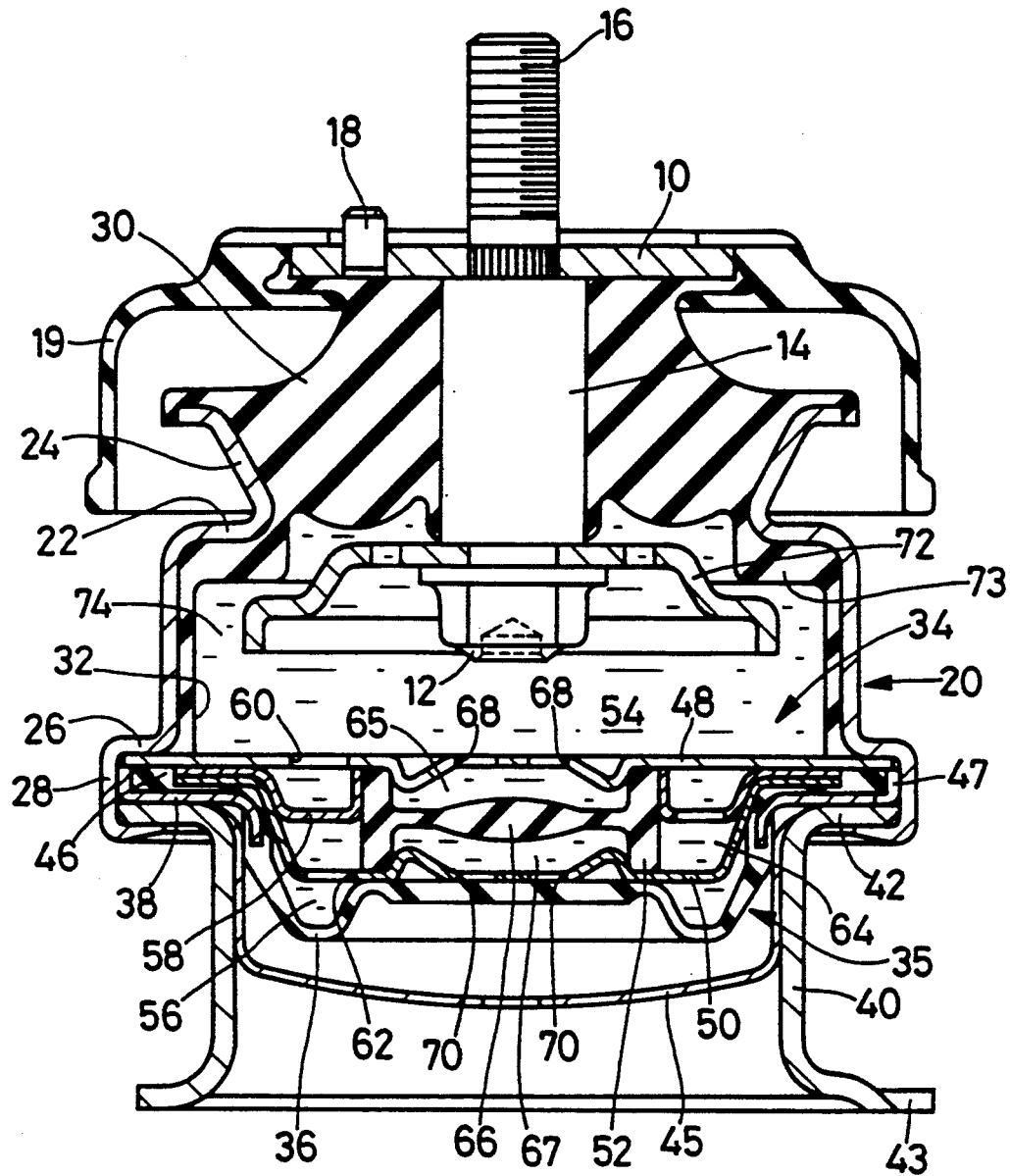
FIG. 1 is an elevational view in axial cross section of a fluid-filled elastic mount in the form of a vehicle engine mount embodying the present invention.

Referring to FIG. 1 showing a vehicle engine mount constructed according to one embodiment of the present invention, reference numeral 10 denotes a first support member in the form of a relatively thick-walled metallic flat plate. A rod member 14 having a fixing bolt 12 at its distal end is fixed to the first support member 10, such that the rod member 14 protrudes from a central portion of the inner surface of the support member 10. At the proximal end of the rod member 14, there is provided a mounting bolt 16 which extends through the first support member 10 and protrudes from the outer surface of the support member 10.

The first support member 10 is fixed to an engine unit of a motor vehicle through the mounting bolt 16. This first support member 10 is formed with a positioning boss 18 which protrudes from the outer surface of the member 10. With the positioning boss 18, the first support member 10 is appropriately positioned relative to the engine unit upon installation of the engine mount on the vehicle. The first support member 10 is also provided at its outer periphery with a protective cover 19.

On one side of the first support member 10 remote from the mounting bolt 16, there is provided a second support member 20 in the form of a generally cylindrical metallic member with a relatively large diameter. These first and second support members 10, 20 are disposed in substantially coaxial relation with each other, with a suitable axial spacing therebetween. The second support member 20 has a radially inward shoulder portion 22 formed on its one axial side nearer to the first support member 10, and a tapered portion 24 which extends axially outwards from the shoulder portion 22. The second support member 20 also has a radially outward shoulder portion 26 formed on the other axial side thereof, and a large-diameter portion 28 which extends radially outwards from the shoulder portion 26.

The first and second support members 10, 20 are elastically connected to each other by an elastic body 30 interposed therebetween. The elastic body 30 is a hollow rubber member having a generally truncated conical shape. The elastic body 30 is secured at its small-diameter end face to the first support member 10, and at its inner circumferential surface to the rod member 14, by means of vulcanization of a rubber material. To the outer surface of the large-diameter end portion of the elastic body 30 is bonded by vulcanization the inner surface of the tapered portion 24 of the second support member 20. Thus, one opening of the second support member 20 on the side of the tapered portion 24 is closed by the elastic body 30, so that the second support member 20 is formed with a cavity 32 which is open at the large-diameter portion 28.

At the opening of the cavity 32 of the second support member 20, there is provided a generally disk-like partition structure 34, and a closure member 35 which consists of a generally circular thin-walled flexible rubber diaphragm 36 and a generally annular metallic ring 38 secured by vulcanization to the outer peripheral portion of the diaphragm 36. The outer peripheral portion of the partition structure 34 and the metallic ring 38 are accommodated in the large-diameter portion 28 of the second support member 20, and are superposed on and supported by the shoulder portion 26 of the support member 20.

On the shoulder portion 26 of the second support member 20, there is also provided a generally cylindrical bracket 40 having an outward flange 42 formed at one axial end thereof, such that the outward flange 42 is superposed on the metallic ring 38. The bracket 40 is formed at the other axial end with a mounting portion 43 which extends radially outwards for attachment with the body of the vehicle. A lid metallic member 45 adapted for protecting the flexible diaphragm 36 is fixed to the inner surface of the mounting portion 43.

The partition structure 34, metallic ring 38 and outward flange 42 of the bracket 40 are thus superposed on the shoulder portion 26 of the second support member 20, and are fixed by caulking to the large-diameter portion 28 of the support member 20. In this manner, these members 34, 38 and 40 are fixedly attached to the second support member 20.

Figure 2:
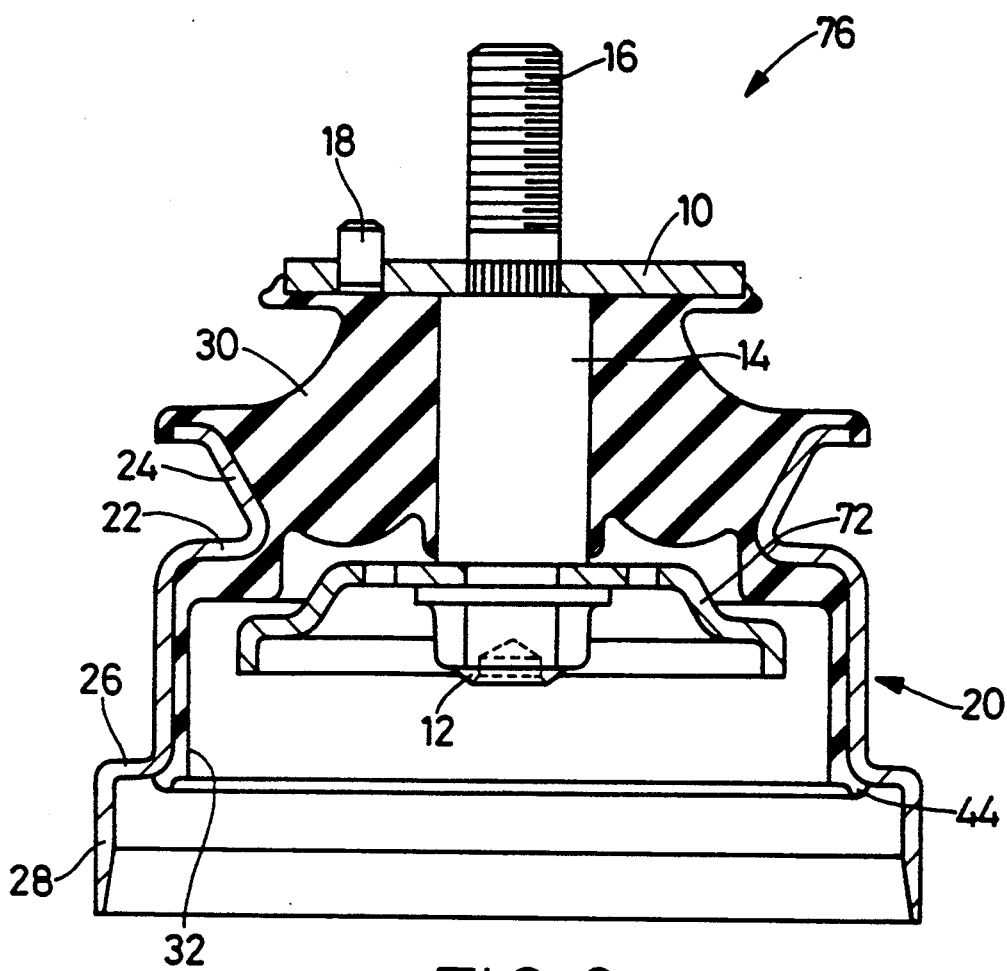
FIG. 2 is an axial cross sectional view showing an integral assembly used in producing the engine mount of FIG. 1.
Figure 4:
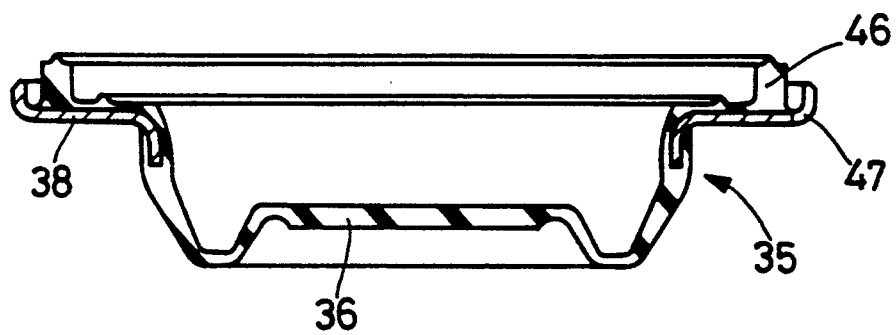
FIG. 4 is an axial cross sectional view of a closure member used in producing the engine mount of FIG. 1, taken along line 4—4 of FIG. 5.

The shoulder portion 26 of the second support member 20 is provided with a first sealing rubber lip 44 having a suitable axial dimension and extending over the entire circumference of the member 20, as shown in FIG. 2. On the other hand, the metallic ring 38 secured by vulcanization to the outer periphery of the diaphragm 36 is provided with a second sealing rubber lip 46 having a suitable axial dimension and extending over the entire circumference of the ring 38, as shown in FIG. 4. This metallic ring 38 is press-fitted in the large-diameter portion 28 of the second support member 20, with the second sealing rubber lip 46 interposed between the metallic ring 38 and the shoulder portion 26.

Upon assembling of the partition structure 34, closure member 35 and bracket 40 with the second support member 20, the first sealing rubber lip 44 is axially pressed by and between the shoulder portion 26 and the partition structure 34, while the second sealing rubber lip 46 is axially pressed by and between the partition structure 34 and the metallic ring 38. This arrangement ensures the seal or fluid-tightness between the mating surfaces of the shoulder portion 26, partition structure 34 and metallic ring 38. In this manner, the opening of the second support member 20 on the side of the large-diameter portion 28 is fluid-tightly closed by or covered with the closure member 35, with the cavity 32 formed in the support member 20.

Figure 5:
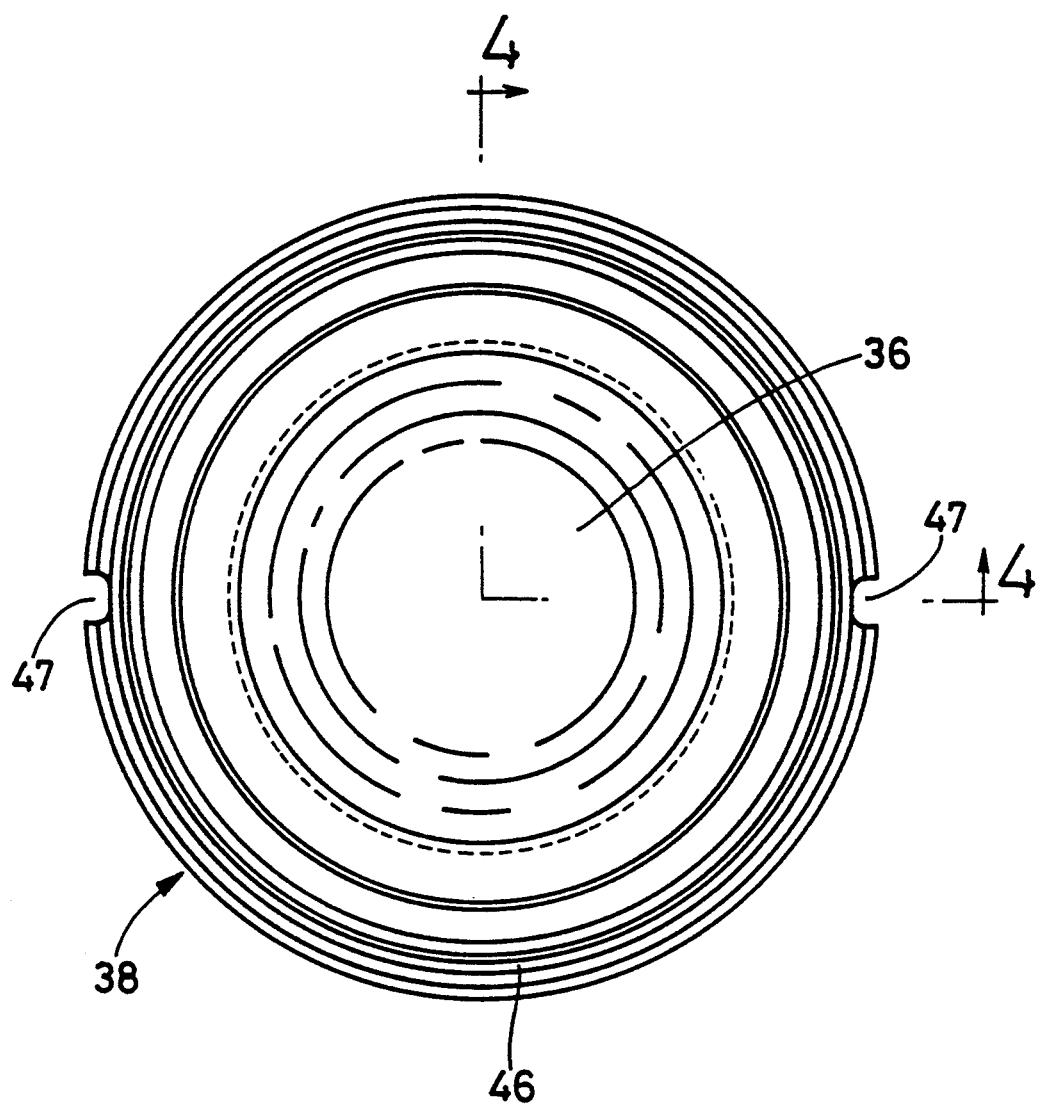
FIG. 5 is a plan view of the closure member of FIG. 4.

As shown in FIG. 5, the metallic ring 38 is formed at its outer peripheral portion with two notches 47, 47, which are located radially outwardly of the second sealing rubber lip 46. When the metallic ring 38 is press-fitted into the large-diameter portion 28, therefore, the cavity 32 is held in communication with the atmosphere through the notches 47, 47, until the first and second sealing rubber lips 44, 46 are sufficiently pressed between the relevant mating surfaces. In this condition, a portion of a non-compressible fluid (which will be described) is allowed to be discharged or released from the cavity 32 through the notches 47, 47. It will be understood from the above description that the notches 47, 47 serve as a fluid discharge passage for permitting the discharge of the fluid from the inside of the mount.

The cavity 32 thus fluid-tightly enclosed by the sealing rubber lips 44, 46 is filled with the non-compressible fluid, to thereby provide a fluid chamber. For example, water, alkylene glycol, polyalkylene glycol or silicone oil is suitably used as the non-compressible fluid.

The partition structure 34 disposed within the cavity 32 includes two rigid partition members, i.e., a generally disk-shaped upper member 48 and a generally hat-shaped lower member 50 which are axially superposed on each other, and an annular elastic member 52 which partitions an interior space between the upper and lower members 48, 50 into radially inner and outer portions. The fluid chamber provided by the cavity 32 is divided by this partition structure 34 into a pressure-receiving chamber on the side of the first support member 10, and a variable-volume equilibrium chamber 56 on the side of the closure member 35. The pressure-receiving chamber 54 is partially defined by the elastic body 30 so that the pressure of the fluid in the chamber 54 changes due to elastic deformation of the elastic body 30 upon application of a vibrational load to the engine mount. The equilibrium chamber 56 is partially defined by the flexible diaphragm 36, so as to permit easy change of the volume of the chamber 56 owing to elastic deformation or displacement of the diaphragm 36.

The above-indicated radially outer portion in the partition structure 34 is axially partitioned by an orifice-defining member 58 into two parts, so as to provide an annular fluid passage which extends over two rounds of the circumference of the partition structure 34. This annular fluid passage communicates at its opposite ends with the pressure-receiving and equilibrium chambers 54, 56, through respective communication holes 60, 62 formed through the upper and lower members 48, 50. Thus, the annular fluid passage provides an orifice passage 64 adapted to permit flow of the fluid between the two chambers 54, 56.

The above-indicated radially inner portion in the partition structure 34 is axially partitioned into two sections 65, 67 by an elastic partition member 66 formed integrally with the annular elastic member 52. The upper section 65 communicates with the pressure-receiving chamber 54, through holes 68 formed through the upper member 48, while the lower section 67 communicates with the equilibrium chamber 56, through holes 70 formed through the lower member 50. In this arrangement, the fluid is allowed to flow between the pressure-receiving chamber 54 and the upper section 65 through the holes 68, and between the equilibrium chamber 56 and the lower section 67 through the holes 70, based on the elastic deformation of the elastic partition member 66. The amount of flow of the fluid through the holes 68, 70 is limited or determined by the elasticity of the elastic partition member 66.

In the pressure-receiving chamber 54 formed on the side of the first support member 10, there is accommodated a generally dish-shaped resonance member 72 which is fixedly supported by the fixing bolt 12 on the rod member 14 so as to extend in the radial direction perpendicular to the axial direction of the engine mount. With the resonance member 72 mounted in position, the outer peripheral portion of the member 72 is axially opposed to the shoulder portion 22 of the second support member 20 with a suitable axial spacing therebetween. Thus, the amount of relative displacement between the first and second support members 10, 20 in the direction away from each other is limited by abutting contact of the resonance member 72 with the shoulder portion 22. A buffer rubber layer 73 is formed on the surface of the shoulder portion 22 on which the resonance member 72 is abuttable.

The pressure-receiving chamber 54 is substantially divided into two sections by the above-described resonance member 72. At the same time, an annular restricted passage 74 is formed between the outer peripheral portion of the resonance member 72 and the inner circumferential wall of the pressure-receiving chamber 54, so that the above two sections of the chamber 54 communicate with each other, through the restricted passage 74, permitting restricted flow of the fluid therebetween.

The thus constructed engine mount is interposed between the engine unit and the vehicle body, such that the first support member 10 is fixed to the engine unit while the second support member 20 is fixed to the vehicle body via the bracket 40.

When a vibrational load is applied between the first and second support members 10, 12 of the engine mount installed in position, the non-compressible fluid is forced to flow between the pressure-receiving and equilibrium chambers 54, 56 through the orifice passage 64, or between the two chambers 54, 56 and the upper and lower sections 65, 67 through the holes 68, 70, based on relative changes in the pressures in the pressure-receiving and equilibrium chambers 54, 56. As a result, the engine mount exhibits a sufficiently high vibration damping effect based on the resonance of the fluid flowing through the orifice passage 64, upon application of low-frequency large-amplitude vibrations such as engine shake. The instant engine mount also provides a reduced dynamic spring constant so as to isolate high-frequency small-amplitude vibrations such as booming noise, based on the flow or resonance of the fluid through the holes 68, 70 due to the elastic deformation of the elastic partition member 66.

When the engine mount receives vibrations having higher frequencies than those to be isolated by the fluid flow due to the deformation of the elastic partition member 66, the resonance member 72 is displaced or oscillated within the pressure-receiving chamber 54, so that the fluid is caused to flow through the restricted passage 74 within the pressure-receiving chamber 54. Consequently, the engine mount provides a reduced dynamic spring constant with respect to the higher-frequency vibrations, based on the resonance of the fluid flowing through the restricted passage 74.

There will be described in detail a method of producing the engine mount constructed as described above. Initially, the first support member 10 assembled with the rod member 14, and the second support member 20 are disposed in position within a mold cavity adapted for forming the elastic body 30. Then, the elastic body 30 is molded in this cavity by means of vulcanization of a rubber material, so that an integral assembly 76 of the support members 10, 12 and elastic body 30 is formed as shown in FIG. 2.

Figure 3:
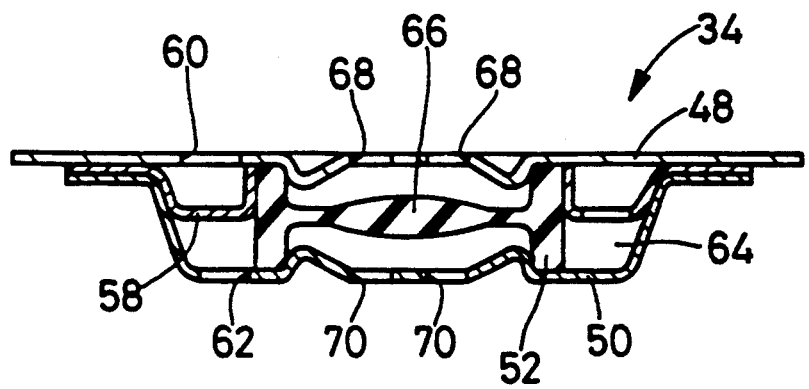
FIG. 3 is an axial cross sectional view showing a partition member used in producing the engine mount of FIG. 1.

Apart from the step of forming the above-described integral assembly 76, the partition structure 34 as shown in FIG. 3 and the closure member 35 as shown in FIGS. 4 and 5 are respectively formed. To form the partition structure 34, the upper member 48 and lower member 50 are superposed on each other with the annular elastic member 52 and orifice-defining member 58 interposed therebetween, and then fixed to each other by spot welding, for example. To form the closure member 35, the generally circular, thin-walled diaphragm 36 is formed of a rubber material, and the metallic ring 38 is secured by vulcanization to the outer peripheral portion of the diaphragm 36.

The metallic ring 38 is provided with the second sealing rubber lip 46 formed integrally with the diaphragm 36, such that the sealing rubber lip 46 having a suitable axial dimension extends continuously over the entire circumference of the ring 38. The metallic ring 38 is also formed with the two notches 47, 47 at its outer peripheral portion located radially outwardly of the second sealing rubber lip 46.

Subsequently, the partition structure 34 is fitted in the large-diameter portion 28 of the second support member 20 of the integral assembly 76. Then, the integral assembly 76 is immersed in a mass of the fluid that is intended to fill the fluid chamber of the engine mount.

Figure 6:
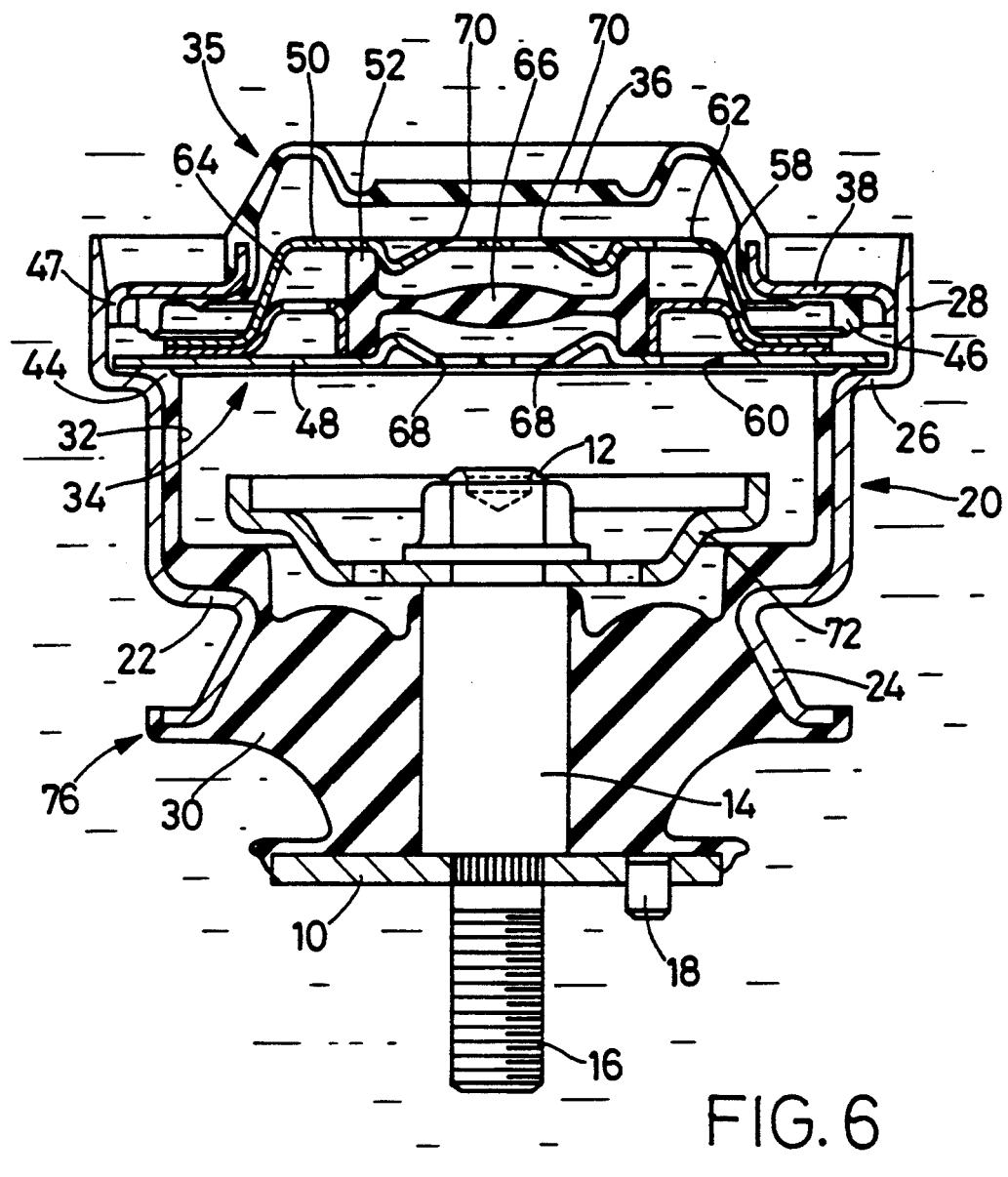
FIG. 6 is an elevational view in axial cross section of an intermediate product formed during manufacture of the fluid-filled elastic mount of FIG. 1.

Thereafter, the metallic ring 38 is press-fitted into the large-diameter portion 28 of the second support member 20 in the mass of the fluid, as shown in FIG. 6, whereby the closure member 35 is assembled into the integral assembly 76. During the press-fitting of the metallic ring 38, the fluid chamber communicates with the outside of the engine mount, through the notches 47, 47 of the ring 38, until the first and second sealing rubber lips 44, 46 establish the seal between the second support member 20 and metallic ring 38. As a result, these notches 47, 47 advantageously permit discharge of a portion of the fluid from the fluid chamber, which portion becomes redundant due to reduction in the volume of the fluid chamber upon press-fitting of the metallic ring 38. Thus, the instant engine mount is prevented from being filled with an excessive amount of the fluid.

Figure 7:
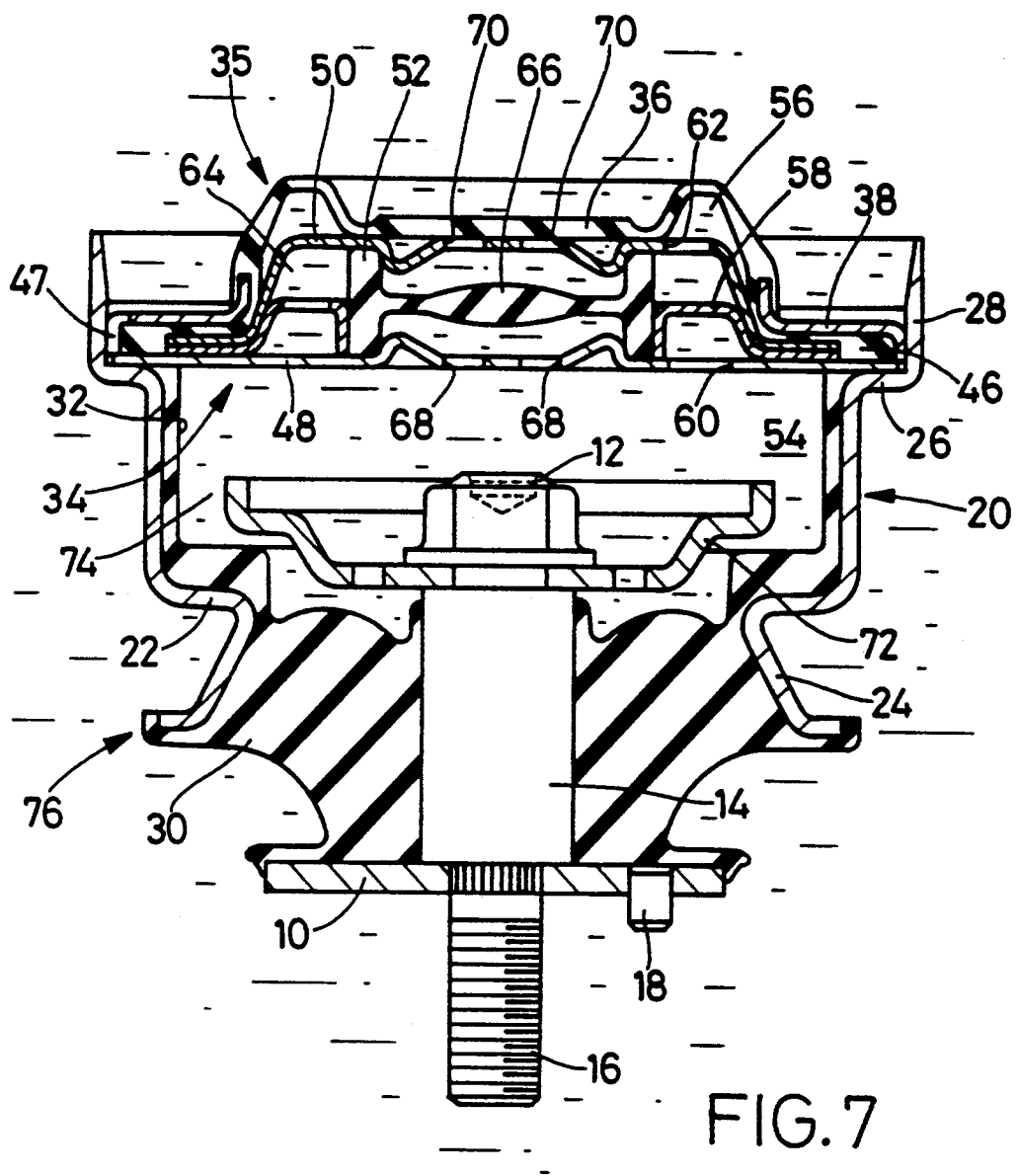
FIG. 7 is an elevational view in axial cross section of an intermediate product formed during manufacture of the fluid-filled elastic mount of FIG. 1.

Then, the metallic ring 38 is further press-fitted into the large-diameter portion 28 of the second support member 20, as shown in FIG. 7, so that the first and second sealing rubber lips 44, 46 are pressed against the metallic ring 38 and the shoulder portion 26 of the support member 20, respectively, through the partition structure 34. As a result, the fluid tightness between the mating surfaces of the second support member 20, partition structure 34 and metallic ring 38 is established, whereby the opening of the cavity 32 of the integral assembly 76 is fluid-tightly closed by the closure member 35. Thus, the pressure-receiving and equilibrium chambers 54, 56 filled with the fluid are formed in the cavity 32, on the opposite sides of the partition structure 34.

Upon completion of the assembling procedure in the fluid as described above, the assembly as shown in FIG. 7 is taken out of the fluid, and the bracket 40 is attached to this assembly in the atmosphere. More specifically, the outward flange 42 of the bracket 40 is inserted into the large-diameter portion 28 of the second support member 20, and then superposed on the metallic ring 38 and partition structure 34 which are superposed on the shoulder portion 26 of the second support member 20. Then, the large-diameter portion 28 is caulked against the outward flange 42 of the bracket 40. In this manner, the bracket 40 is attached to the second support member 20, taking account of the orientation of the bracket 40 relative to the first support member 10.

Finally, the protective cover 19 is fixed to the first support member 10, whereby the instant engine mount as shown in FIG. 1 is obtained.

With the large-diameter portion 28 of the second support member 20 caulked against the outward flange 42 of the bracket 40, the partition structure 34 and metallic ring 38 as well as the bracket 40 are fixed to the second support member 20. Thus, the partition structure 34 and metallic ring 38 are prevented from being slipped out of the second support member 20, whereby the fluid-tight seal of the fluid chamber filled with the fluid is maintained with high durability.

According to the method as described above, upon filling of the fluid chamber (i.e., pressure-receiving chamber 54 and equilibrium chamber 56) with the fluid, the fluid tightness of the fluid chamber is established by press-fitting the metallic ring 38 bonded by vulcanization to the outer peripheral portion of the diaphragm 36, into the large-diameter portion 28 of the second support member 20. Therefore, there is no need to effect caulking of the large-diameter portion 28 in the mass of the fluid.

When the metallic ring 38 is press-fitted into the large-diameter portion 28 of the second support member 20, a redundant portion of the fluid in the fluid chamber is readily discharged to the outside of the mount, through the notches 47, 47 formed in the ring 38. Accordingly, the fluid chamber is free from an excessive rise in the pressure of the fluid therein due to the volume reduction of the chamber upon press-fitting of the metallic ring 38.

It follows that the assembling procedure in the fluid is considerably simplified according to the method described above, permitting simplification of the installation for manufacturing the engine mount, and easy automation of the assembling procedure. Further, the amount of the fluid in the mount is maintained at a nominal value, assuring desired vibration damping-/isolating capability of the engine mount with high stability.

According to the method of the instant embodiment, the bracket 40 is fixed by caulking to the second support member 20 in the atmosphere, without requiring the bracket 40 to be immersed within the fluid. Accordingly, the bracket 40 may be positioned relative to the second support member 20 with remarkably enhanced efficiency, and need not be wiped after the assembling of the engine mount.

While the present invention has been described above in detail in its presently preferred embodiment, for illustrative purpose only, it is to be understood that the present invention is not limited to the details of the illustrated embodiment.

In the illustrated embodiment, the first and second sealing rubber lips 44, 46 are formed on the mutually facing surfaces of the shoulder portion 26 of the second support member 20 and the metallic ring 38, respectively, since the outer peripheral portion of the partition structure 34 is sandwiched by and between the shoulder portion 26 and the ring 38. However, such a sealing rubber lip may be provided on one of the shoulder portion 26 and the metallic ring 38 so that the sealing rubber lip is directly gripped by and between the mutually facing surfaces of these two members 26, 38.

Further, the metallic member (38) is not necessarily bonded by vulcanization to the flexible diaphragm 36, but may be fixed to the same in any other manners as long as the fluid chamber closed by the closure member 35 assures a sufficiently high degree of fluid tightness.

Moreover, the construction of the fluid discharge passage for permitting the fluid to be discharged from the fluid chamber during press-fitting of the metalling ring into the second support member is not limited to the details of the illustrated embodiment. For instance, an axial groove may be formed in the inner circumferential surface of the large-diameter portion of the second support member so as to provide the fluid discharge passage.

While the bracket 40 is fixed by caulking to the second support member 20 in the illustrated embodiment, the bracket 40 may be eliminated, or may be formed directly on the outer circumferential surface of the second support member 20.

The construction of the fluid chamber including the orifice passage is not limited to the details of the illustrated embodiment, but may be modified as needed depending upon the required vibration damping/isolating characteristics of the elastic mount, for example.

While the illustrated embodiment of the invention is used as an engine mount of a motor vehicle, the principle of the present invention is equally applicable to any fluid-filled elastic mounts other than the engine mount, for example, to a vehicle body mount and a differential gear mount, and even applicable to various mounting devices other than those for motor vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount for flexibly connecting two members, comprising:

a first and a second support member which are fixed to one and the other of the two members to be flexibly connected, respectively, said first and second support members being spaced apart from each other in an axial direction of the elastic mount, said second support member having a generally cylindrical shape with axially opposite openings;

an elastic body interposed between said first support member and one of said axially opposite openings of said second support member, to elastically connect said first and second support members;

said second support member including a shoulder portion which extends radially outwards from an axially intermediate portion thereof, and a large-diameter portion which extends axially outwards from said shoulder portion to define the other of said axially opposite openings of said second support member;

a closure member fluid-tightly closing the other of said axially opposite openings of said second support member to thereby form a fluid chamber in the second support member, said closure member comprising a flexible diaphragm and a metallic member secured to an outer peripheral portion of said flexible diaphragm, said metallic member being press-fitted in said large-diameter portion of said second support member to thereby directly abut on an inner surface of said second support member, and fixed therein by caulking of said large-diameter portion, whereby said closure member is fixed to said second support member, said fluid chamber being filled with a non-compressible fluid and comprising a pressure-receiving chamber partially defined by said elastic body and an equilibrium chamber partially defined by said flexible diaphragm, said pressure-receiving and equilibrium chambers communicating with each other through an orifice passage;

at least one sealing rubber lip formed on at least one of mutually facing surfaces of said metallic member and said shoulder portion of said second support member, so as to protrude in said axial direction of the mount and extend over an entire circumference of said second support member, said at least one sealing rubber lip being pressed between said metallic member and said shoulder portion; and means for defining a fluid discharge passage located radially outwardly of said at least one sealing rubber lip and formed between said metallic member and said large-diameter portion of said second support member, for permitting discharge of a portion of said non-compressible fluid from said fluid chamber, said fluid discharge passage extending in a direction in which said metallic member is press-fitted into said large-diameter portion.

2. A fluid-filled elastic mount according to claim 1, wherein said fluid discharge passage comprises two notches formed in an outer peripheral portion of said metallic member which is located radially outwardly of said at least one sealing rubber lip.

3. A fluid-filled elastic mount according to claim 1, further comprising a partition structure for partitioning said fluid chamber into said pressure-receiving and equilibrium chambers and defining said orifice passage, said partition structure being sandwiched by and between said shoulder portion of said second support member and said metallic member.

4. A fluid-filled elastic mount according to claim 3, wherein said at least one sealing rubber lip consists of two rubber lips respectively formed on said mutually facing surfaces of said metallic member and said shoulder portion of said second support member such that said two rubber lips are pressed against said partition structure.

5. A fluid-filled elastic mount according to claim 3, wherein said partition structure comprises two rigid partition members each having a plurality of holes, and an elastic partition member disposed between said two rigid partition members for accommodating pressure changes in said pressure-receiving and equilibrium chambers.

6. A fluid-filled elastic mount according to claim 1, further comprising a bracket fixed to said second support member for attachment to the other of said two members to be flexibly connected, said bracket having an outward flange which is superposed on said metallic member in said axial direction of the mount, said large-diameter portion of said second support member being caulked against said outward flange.

7. A fluid-filled elastic mount according to claim 1, further comprising a resonance member accommodated in said pressure-receiving chamber so as to extend in a radial direction of the elastic mount to thereby divide said pressure-receiving chamber into two sections, said resonance member cooperating with said elastic body to define therebetween a restricted passage for permitting restricted flow of said fluid between said two sections of said pressure-receiving chamber.

8. A method of producing a fluid-filled elastic mount comprising: a first and a second support member which are spaced apart from each other in an axial direction of the elastic mount, said second support member having a generally cylindrical shape with axially opposite openings; an elastic body interposed between said first support member and one of said axially opposite openings of said second support member, to elastically connect said first and second support members; and a closure member including a flexible diaphragm, for fluid-tightly closing the other of said axially opposite openings of said second support member to thereby form a fluid chamber in the second support member, said fluid chamber being filled with a non-compressible fluid and comprising a pressure-receiving chamber partially defined by said elastic body and an equilibrium chamber partially defined by said flexible diaphragm, said pressure-receiving and equilibrium chambers communicating with each other through an orifice passage, said method comprising the steps of:

preparing a first assembly of said first and second support members elastically connected by said elastic body, said second support member being formed to have a shoulder portion which extends radially outwards from an axially intermediate portion thereof, and a large-diameter portion which extends axially outwards from said shoulder portion to define the other of said axially opposite openings of the second support member;

securing a metallic member to an outer peripheral portion of said flexible diaphragm to thereby provide said closure member;

press-fitting said metallic member into said large-diameter portion of said second support member in a mass of said non-compressible fluid, while discharging a redundant portion of said fluid from said fluid chamber, through a fluid discharge passage formed between press-fitted surfaces of said large-diameter portion and said metallic member;

forming at least one sealing rubber lip on at least one of mutually facing surfaces of said metallic member and said shoulder portion of said second support member, so that said at least one sealing rubber lip is pressed between said shoulder portion and said metallic member, whereby the other opening of said second support member is fluid-tightly closed by said closure member to provide a second assembly having said fluid chamber formed therein; and taking said second assembly out of said mass of said non-compressible fluid, and caulking said large-diameter portion of said second support member against said metallic member in the atmosphere so as to fix said metallic member to said second support member.

9. A method of producing a fluid-filled elastic mount according to claim 8, wherein said metallic member is secured to said outer peripheral portion of said flexible diaphragm, by vulcanization of a rubber material of which said flexible diaphragm is formed.

* * * * *